(12) United States Patent
Asaoka (10) Patent No.: US 7,858,267 B2
(45) Date of Patent: Dec. 28, 2010

(54) FUEL CELL ELECTRODE, FUEL CELL, AND MANUFACTURING METHODS THEREOF

(75) Inventor: Takahiko Asaoka, Nagoya (JP)

(73) Assignee: Kabushiki Kaisha Toyota Chuo Kenkyusho, Aichi-Ken (JP)

( * ) Notice: Subject to any disclaimer, the term of this patent is extended or adjusted under 35 U.S.C. 154(b) by 1335 days.

(21) Appl. No.: 10/891,208

(22) Filed: Jul. 13, 2004

(65) Prior Publication Data

US 2005/0019650 A1    Jan. 27, 2005

(30) Foreign Application Priority Data

Jul. 24, 2003    (JP) .............................. 2003-278836

(51) Int. Cl.
*H01M 4/02* (2006.01)
*H01M 4/36* (2006.01)

(52) U.S. Cl. ...................................... 429/531; 429/530

(58) Field of Classification Search ................. 429/530, 429/531
See application file for complete search history.

(56) References Cited

U.S. PATENT DOCUMENTS

| | | | |
|---|---|---|---|
| 4,472,488 A * | 9/1984 | Maxfield et al. | ............ 429/213 |
| 4,877,694 A * | 10/1989 | Solomon et al. | ............... 429/27 |
| 4,960,761 A * | 10/1990 | Yodice | ........................ 502/159 |
| 5,346,780 A | 9/1994 | Suzuki | |
| 5,824,434 A * | 10/1998 | Kawakami et al. | .......... 429/209 |
| 6,117,581 A | 9/2000 | Shelef | |
| 6,479,181 B2 | 11/2002 | Finkelshtain et al. | |
| 6,579,639 B1 * | 6/2003 | Gyoten et al. | ................. 429/34 |

FOREIGN PATENT DOCUMENTS

| | | |
|---|---|---|
| JP | 61-40320 | 2/1986 |
| JP | 3-115323 | 5/1991 |
| JP | 3158490 | 7/1991 |
| JP | 2000-106203 | 4/2000 |
| JP | 2002110190 | 4/2002 |
| JP | 2003203642 | 7/2003 |

OTHER PUBLICATIONS

Patent Abstracts of JP2000-106203 published on Apr. 11, 2000.

* cited by examiner

*Primary Examiner*—Patrick Ryan
*Assistant Examiner*—Muhammad Siddiquee
(74) *Attorney, Agent, or Firm*—Leason Ellis LLP.

(57) ABSTRACT

A fuel cell electrode which can improve the catalyst utilization rate by having the catalyst component supported at a high density and high dispersion is provided. An aqueous solution containing chloroplatinic acid and aniline is prepared. For an electrode diffusion layer, a carbon paper is soaked in a Teflon® dispersion solution and then dried. One side of the electrode diffusion layer is placed in contact with the liquid surface of the solution, and a counter-electrode made of graphite is provided in the solution. A constant electrical current is applied between them, with the electrode diffusion layer side as the positive electrode. As a result, aniline is oxidatively polymerized by electrochemical means, and a uniform layer of platinum-containing polyaniline is formed on the electrode diffusion layer surface. The platinum in the polyaniline is reduced, and this is washed with pure water and dried to make the electrode. Two of these electrodes, with the catalytic layer of the platinum-containing polyaniline on the inside, are placed against both sides of Nafion® to create a small fuel cell.

7 Claims, 5 Drawing Sheets

Co-TPPS: Cobalt-tetraphenyl porphyrin sulfonic acid

FIG. 7

Co-TPP: Cobalt-tetraphenyl porphyrin

FIG. 8

FUEL CELL ELECTRODE, FUEL CELL, AND MANUFACTURING METHODS THEREOF

INCORPORATION BY REFERENCE

The present application claims priority under 35 U.S.C. §119 to Japanese Patent Application No. 2003-278836 filed on Jul. 24, 2003. The content of the application is incorporated herein by reference in its entirety.

FIELD OF THE INVENTION

The present invention relates to a fuel cell electrode, a fuel cell, and manufacturing methods thereof. Described in more detail, the present invention relates to a fuel cell electrode, fuel cell, and manufacturing methods thereof which are suitable for use in electrochemical devices, such as a polymer electrolyte membrane fuel cell, alkaline fuel cell, water electrolysis apparatus, halogenated hydroacid electrolysis apparatus, salt electrolysis apparatus, oxygen and/or hydrogen concentrating apparatus, humidity sensor, gas sensor, and the like.

Figure 1:
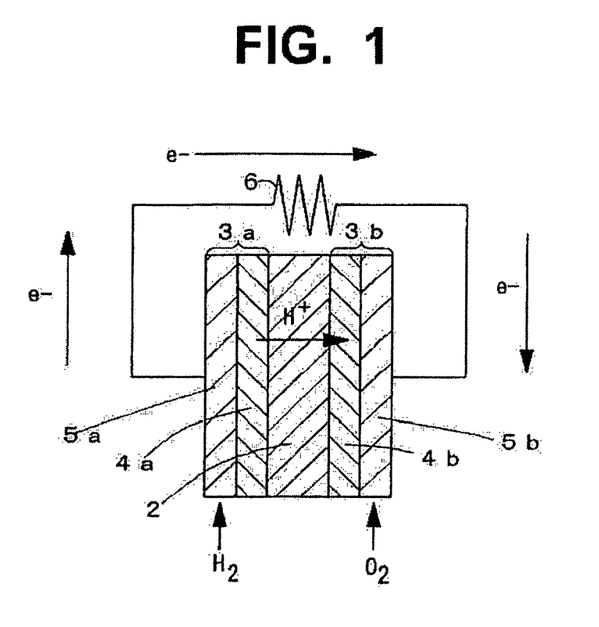
FIG. 1 is a diagram of the structure of a polymer electrolyte membrane fuel cell.

Referring to FIG. 1, a polymer electrolyte membrane fuel cell 1 has fuel cell electrodes 3 (anode 3a, cathode 3b) joined on either side of a solid polymer membrane 2. Generally, fuel cell electrode 3 has a two layer construction, comprising a catalytic layer 4 (4a, 4b) and a gas diffusion layer 5 (5a, 5b). Fuel cell electrode 3 is joined with polymer electrolyte membrane 2 on the inner side of catalytic layer 4 and on the outer side of gas diffusion layer 5. Electrical energy is generated by supplying fuel, for example, hydrogen to anode 3a and, for example, oxygen and the like to cathode 3b and having an electrochemical reaction at fuel cell electrodes 3.

In general, at anode 3a, there is an electrochemical reaction $H_2 \rightarrow 2H^+ + 2e^-$, and at cathode 3b, there is an electrochemical reaction, $2H^+ + 2e^- + 1/2 O_2 \rightarrow H_2O$. The electrons released from anode 3a move to cathode 3b after being used to generate electrical energy in the area of a load 6. After the electrons generated at anode 3a are used for generating electricity at a load 6, they move to cathode 3b. Protons generated at anode 3a pass through polymer electrolyte membrane 2 and move to cathode 3b. At cathode 3a, the electrons, protons and oxygen gas react to form water.

Gas diffusion layer 5 supplies reaction gas (for example, hydrogen and oxygen) to catalytic layer 4 and gives and receives electrons to and from catalytic layer 4. Generally, a porous material, for example, carbon fiber, carbon paper and carbon cloth is used for gas diffusion layer 5. Because it is the pathway for the reaction gas, porosity is required.

Additionally, catalytic layer 4 is the reaction site for the electrode reaction and comprises an electron conducting member, a catalytic component, an ion conducting member, and pores. Normally, powder or porous carbon material which is corrosion-resistant is used for the electron conducting member. For the catalytic component, in general, precious metal particles, for example, Pt or particles of alloy containing precious metals, macrocycle metal complexes such as porphyrin or phthalocyanine are used. Generally, the same materials used for the electrolyte membrane are used for the ion conducting member. The use of a fluorocarbon-type ion exchange resin, such as Nafion® (registered trademark of DuPont Co), and a hydrocarbon-type ion exchange resin are common.

BACKGROUND OF THE INVENTION

In the prior art, for example, a catalytic layer comprising a complex of carbon supported Pt (carbon supporting Pt as a catalyst) and a fluorocarbon-type ion exchange resin (Nafion®) is known. When a complex of a carbon supported Pt and fluorocarbon-type ion exchange resin is used, there must be a three-phase interface in which a region where electrons flow (electron conductive region) and a region where the ions flow (ion conductive region) and pores for gas diffusion (pores) are all present. Additionally, the catalyst itself must be present at the three-phase interface.

Generally, this type of catalytic layer of the prior art is manufactured by the following method: (1) the electron conductive member, catalytic component, and ion conductive member are mixed so that suitable pores are present; (2) a suitable solvent, is added to form a paste and is coated onto an electrode base and (3) the solvent is dried and removed. Such an example is disclosed in Japanese Laid-Open Patent Publication Number 2000-106203.

Additionally, in recent years, there has been much interest in using a conductive polymer instead of carbon for the catalytic layer of the fuel cell electrode. Conductive polymers have the same electroconductivity as carbon, and conductive polymers are highly porous like carbon. Therefore, there is adequate gas diffusivity.

For example, with the catalytic layer of the cathode disclosed in U.S. Pat. No. 5,346,780, (1) a fiber-like mass of a mixture containing a modifying catalyst (a proton conductive thin film formed on top of a carbon supported Pt) and polytetrafluoroethylene is deposited on carbon paper and sintered to form an electrode substrate; and (2) a thin film in which trifluoro-methanesulfonic acid is retained within a polyaniline network is formed by electrolytic polymerization on top of this electrode substrate (in this case, polyaniline is used as the polymer network and trifluoro-methanesulfonic acid is used as the proton conductive monomer.)

The catalytic layer of the fuel cell electrode disclosed in U.S. Pat. No. 6,117,581 (reference patent 3) is created by the following method: (1) channels are dehydrated by heating zeolite, and after introducing aniline monomers into the channels, this is heated under pressure and polymerized with a suitable catalyst, forming polyaniline in the zeolite channels; (2) catalytic particles (for example Pt) are uniformly dispersed in a mixture of zeolite incorporated with polyaniline and carbon particles, and this is mixed in a solution to make an ink; and (3) this ink is hot pressed onto an electrolyte membrane.

Additionally, a transitional metal (Pt) can be covalently bonded to the hetero atom contained in a conductive polymer (polyaniline). The catalytic layer of the fuel cell electrode disclosed in U.S. Pat. No. 6,479,181 is obtained by the following method: (1) a chloroplatinic acid solution is added to a polyaniline suspension solution and stirred; (2) the polyaniline-PtCl$_4$ complex is separated by centrifugation, (3) Pt is reduced using a reducing agent, and (4) this is dried.

However, the catalytic layers of the fuel cell electrodes of the prior art had the following problems.

Firstly, the catalytic layer must have adequate electroconductivity, ionic conductivity, and gas diffusivity. However, in Japanese Laid-Open Patent Publication No. 2000-106203 for example, the catalytic layer is a mixture of materials each relating to electroconductivity, ionic conductivity, and gas diffusivity, and if the amount of the electroconductive member (carbon) is increased in order to increase electroconductivity, the relative amount of ionic conductive member (fluorine-type ion exchange resin) is reduced, and ionic conductivity is reduced. There are tradeoffs of the different properties.

Additionally, because the site of the electrode reaction in the catalytic layer is at the three phase interface described above, the three phase interface must be formed efficiently. With the catalytic layer of the Japanese Laid-Open Patent Publication No. 2000-106203, for example, even if the three-phase interface is created in the location where the reaction will occur, it is difficult to maintain continuity where the three-phase interface (each phase) is all connected in the catalytic layer. For example, because the mixing method, mixing ratios, and the like influence the properties (electroconductivity, ionic conductivity, and gas diffusivity), the catalytic component could not be dispersed while maintaining the continuity of each phase, and an ideal three phase interface could not always be formed. As a result, in areas where the three-phase interface is not formed, the catalyst does not perform, and the catalyst utilization rate is poor.

Secondly, with the catalytic layer of the prior art (for example Japanese Laid-Open Patent Publication No, 2000-106203), the catalyst is attached to a surface of a support with a large surface area and is electroconductive (a carbon material such as carbon black). This is in order to prevent assembly and aggregation of the catalytic components to each other and to prevent reduction in dispersibility. However, even when the forces that act between Pt molecules are relatively weak, such as an intermolecular force, aggregation of Pt is not adequately prevented. As a result, a catalytic layer with sufficient dispersion of catalyst is not obtained.

With known supports such as carbon black, the number of bonding sites for the catalytic components is sparse. As a result, when there is a high density of catalytic components which is greater than the number of bonding sites, the aggregation and cohesion of catalytic components cannot be prevented. As a result, a catalytic layer having sufficient dispersion of catalyst is not obtained.

Similarly in U.S. Pat. No. 5,346,780, because a polyaniline network thin film in which tri-fluoro methanesulfonic acid is retained is formed on surface of an electrode substrate, it is not possible sufficiently to disperse Pt over the entire catalytic layer.

In U.S. Pat. No. 6,117,581, catalytic particles are uniformly dispersed in a mixture of polyaniline in zeolite and carbon particles, and this is used to form a catalytic layer on surface of an electrolyte membrane by hot press. Therefore the aggregation of catalytic particles is not suppressed, and the catalyst is not sufficiently dispersed over the entire layer. The number of bonding sites for the catalytic particles on carbon and zeolite is limited, and if there is a higher density of catalytic components than the number of sites, the aggregation of catalytic components cannot be suppressed.

In U.S. Pat. No. 6,479,181, a platinum chloride acid is added to a polyaniline suspension solution. After conducting a prescribed treatment, this is reduced, and the transitional metal is covalently bonded to the hetero atom. Therefore, the force acting between the support and the catalytic component is thought to be relatively strong. However, because platinum chloride acid is added later to polyaniline which is a polymerized product, the platinum chloride acid does not adequately enter the polyaniline, and the catalytic component cannot be dispersed at a high density.

As described above, if the catalytic component cannot be dispersed adequately at high densities, the catalyst utilization rate is poor. This has a negative impact on the efficiency and output of the fuel cell.

SUMMARY OF THE INVENTION

The objective of the present invention is to provide a fuel cell electrode, a fuel cell, and a manufacturing method for the same in which the tradeoff between electroconductivity and ionic conductivity seen in the catalytic layer of the prior art is eliminated and in which catalytic components can be adequately dispersed at high densities, resulting in a higher catalyst utilization rate.

The present inventors noted that conductive polymers have similar electroconductivity and porosity to carbon, and that by conducting oxidative polymerization, the conductive polymer itself becomes a large ion (+ion). With regard to conductivity and porosity, these are considered to be properties of conductive polymers. However, when oxidative polymerization is conducted, there is the additional property of ionic conductivity within the matrix of the polymer. In other words, by conducting oxidative polymerization, the conductive polymer has the three required properties for a catalytic layer: electroconductivity, ionic conductivity, and gas diffusivity.

The present inventors constructed the catalytic layer so that the conductive polymer which has the three required properties is present throughout the entire catalytic layer. Additionally, because the conductive polymer itself does not have catalytic activity, during oxidative polymerization, a catalytic component is introduced uniformly to the site of the conductive polymer relating to ionic conductivity. This is thought to result in density and adequate dispersion of the catalytic component.

In order to achieve the above objects, one embodiment of a fuel cell electrode and fuel cell of the present invention contains, in a catalytic layer, a conductive polymer containing a catalytic component. The conductive polymer is obtained by an oxidative polymerization process in which precursor monomers of the conductive polymer and the catalytic component are oxidatively polymerized. In this case, an anionic substance can be used for the catalytic component, an anionic macrocycle complex can be used for the anionic substance.

Another embodiment of a fuel cell electrode and fuel cell of the present invention contains, in the catalytic layer, a conductive polymer containing a catalytic component. After conducting the oxidative polymerization process in which precursor monomers of the conductive polymer and the catalytic component are oxidatively polymerized, a reduction process is performed in which a reducing agent is used to reduce the catalytic component. In this case, an anionic substance can be used for the catalytic component, and an inorganic acid ion can be used as the anionic substance.

Precursor monomers used in the oxidative polymerization process, can include those which result in pi-conjugated polymers. This is in order to obtain, through polymerization in the oxidative polymerization process, a polymer network of at least one or more of polyaniline, polypyrrole, polythiophene, polyacetylene, and conductive polymers with side chains attached to these molecular backbones.

The fuel cell electrodes obtained by the manufacturing processes described above become the site for the meeting and reaction of electron, ion, and gas molecules. Therefore, increasing the area of the three-phase interface where the electroconductive phase, ion conductive phase, gas diffusing phase coexist is an important factor for improving these properties. Additionally, density of the catalytic component and the dispersal of the catalytic component at the three phase interface are also important factors.

Conductive polymers such as polypyrrole, polyaniline, and the like are polymer materials with electroconductivity, However, because the polymer chains themselves are huge ions, they also have ionic conductivity. Additionally, because there are spaces between molecules or between secondary aggregates (fibrils or sphere-shaped), they are gas-permeable materials.

Therefore, because the conductive polymer matrix of the fuel cell electrode of the present invention has electroconductivity, ionic conductivity, and gas permeability, a three phase interface is formed easily over a wide three dimensional area.

Additionally, the anionic substance dispersed in the conductive polymer is relatively large, and larger molecules are more easily introduced. Because there is a large electrostatic interaction between the conductive polymer and the anionic substance, the catalytic component of the fuel cell electrode of the present invention is adequately dispersed at a high density by oxidative polymerization.

As described above, the fuel cell electrode and fuel cell of the present invention has a catalytic layer which contains a conductive polymer containing a catalytic component where the conductive polymer is obtained by an oxidative polymerization process in which precursor monomers for the conductive polymer and the catalytic component are oxidatively polymerized. As a result, the three phase interface which is the reaction site is formed efficiently. Additionally, the catalytic component is adequately dispersed at a high density in the catalytic layer. Therefore, when this electrode is assembled into a fuel cell and is operated, the catalyst utilization rate, operation efficiency, and output are improved.

In another embodiment, a manufacturing method for the fuel cell electrode and fuel cell of the present invention is presented. In an oxidative polymerization process, precursor monomers for the conductive polymer and the catalytic component are oxidatively polymerized. As a result, the three phase interface which is the reaction site is efficiently formed. Additionally, the catalytic component is adequately dispersed at a high density in the catalytic layer. Therefore, the catalyst utilization rate, operation efficiency, and output of the fuel cell are improved.

BRIEF DESCRIPTION OF THE DRAWINGS

The following key is used in the drawings
Description of the Numerals
1 Polymer electrolyte membrane fuel cell
2 Electrolyte membrane
3 (3a, 3b) fuel cell electrode
4 (4a, 4b) Catalytic layer
5 (5a, 5b) Diffusion layer
6 Load

DETAILED DESCRIPTION OF THE INVENTION

Referring to the drawings, several embodiments of the present invention are described.

The fuel cell electrode of the present invention can be used for a polymer electrolyte membrane fuel cell 1 having the construction shown in FIG. 1, for example. In particular, catalytic layer 4 (4a, 4b) contains a conductive polymer containing a catalytic component.

In one embodiment, the fuel cell electrode has a catalytic layer which contains a conductive polymer containing a catalytic component which is obtained through an oxidative polymerization process in which precursor monomers of the conductive polymer and the catalytic component are oxidatively polymerized. A conductive polymer containing a catalytic component is a conductive polymer which contains a catalytic component. The catalytic component is not limited, and its method for being contained in the conductive polymer is not limited. In this case, an anionic substance can be used as the catalytic component. An ionic macrocycle complex can be used as the anionic substance. An anionic substance is an ion with a negative charge. As long as it has an electrostatic interaction with the conductive polymer, its structure is not limited. It can be polyatomic or monoatomic.

The precursor monomer of the conductive polymer is selected from the group consisting of aniline, pyrrole, thiophene, acetylene, or their derivatives in which side chains are attached to their molecular backbones. Once polymerized, the precursor monomers become a pi-conjugated polymer, or in other words, a polymer network of one or more selected from the group consisting of polyaniline, polypyrrole, polythiophene, polyacetylene, and their derivatives in which a side chain is attached to their molecular backbones.

An ionic macrocycle complex is an ion complex in which a metal ion is positioned on a ring-shaped ligand. Its structure is not limited. For example, it can include a chelate ring, and its central metal can be a transitional metal element with catalytic activity. Concrete examples of complexes which can construct a ring-shaped ligand include phthalocyanine complex, naphthalocyanine complex, porphyrin complex, tetra-aza-annulene complex, thalene complex, hemoglobin complex, and catalase complex. Pt, Fe, Co, Ni, Cu, Ti, V, Cr, Mn can be used as the element for the metal ion.

Figure 3:
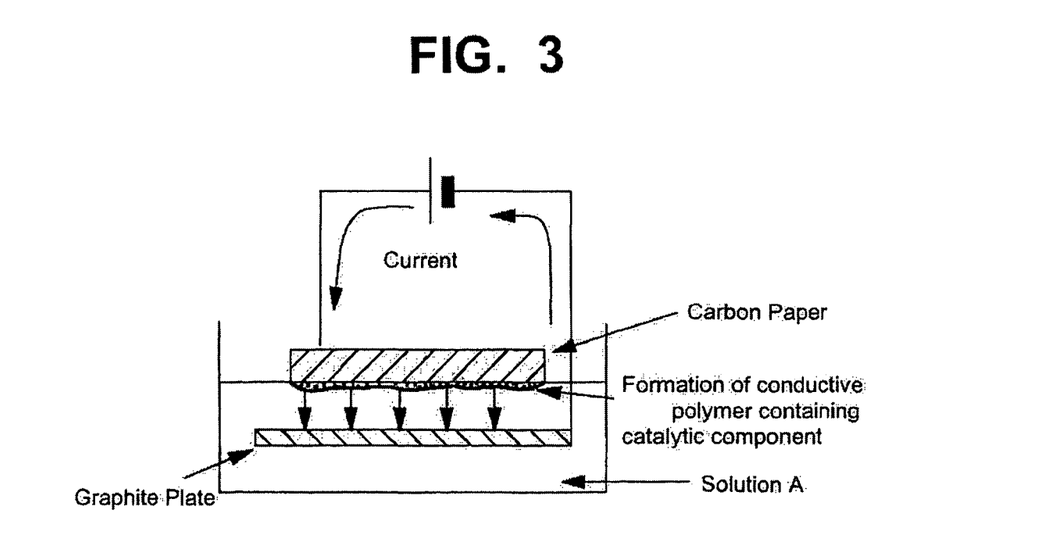
FIG. 3 is a schematic drawing of a device used in electrolytic polymerization relating to an embodiment of the present invention.

The manufacture of the fuel cell electrode of the first mode is conducted as follows. First for the catalytic layer, an aqueous solution containing precursor monomers and an ionic macrocycle complex (catalytic component) is prepared. Second, water-repellant carbon is prepared for the diffusion layer. Referring to FIG. 3, one side of the water-repellant carbon is brought into contact with this aqueous solution water surface, and a current is applied between the water repellant carbon and a counter electrode (made of graphite, for example) provided separately in the solution (electrolytic polymerization). Third, the water-repellant carbon on which the conductive polymer containing the catalytic component is formed is washed.

Next, the action of the fuel cell electrode of an embodiment will be described. In the oxidative polymerization process, the precursor monomer for the conductive polymer and the catalytic component are oxidatively polymerized. Oxidative polymerization is conducted as the precursor monomers (aniline for example) incorporate the ionic macrocycle complex (cobalt-tetraphenyl porphyrin sulfonate for example) as a dopant, and this becomes the conductive polymer containing the catalyst component (polyaniline containing Co-TPPS, for example).

Figure 2A:
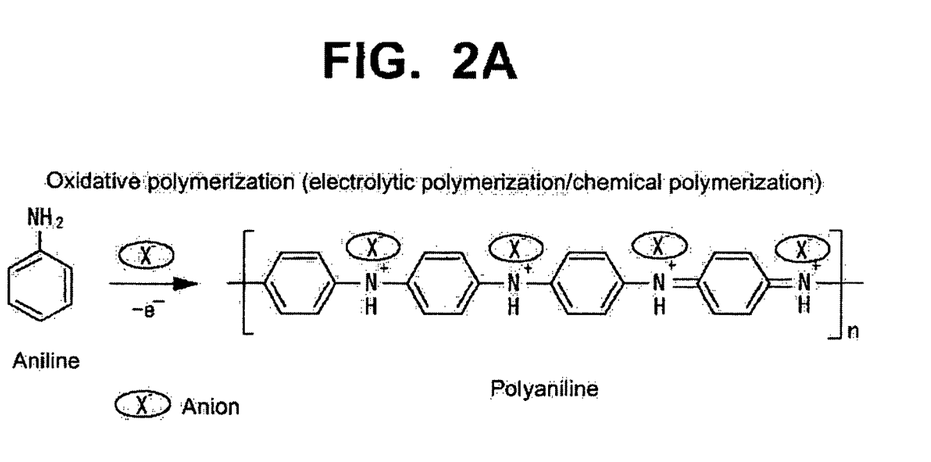
FIG. 2(a) shows the oxidative polymerization of aniline.

The incorporated anionic substance interacts electrostatically with the cationic portion on the molecular chain of the conductive polymer (See FIG. 2(a)). In other words, when the anionic catalytic component is introduced as a dopant, the catalytic component enters the polymer by an electrostatic interaction with the cationic portion of the conductive polymer chain. As a result, the catalytic component enters the conductive polymer highly dispersed at a high density without the catalytic components aggregating with each other.

Furthermore, because there is an electrostatic interaction between the anionic catalytic component and the cationic portion of the conductive polymer, there is a rapid movement of charge between the catalytic component and the conductive polymer backbone. Therefore, catalytic activity is improved.

In a fuel cell electrode of another embodiment, after an oxidative polymerization process in which conductive polymer precursor monomers and a catalytic component are oxidatively polymerized, there is a reduction process in which the catalytic component is reduced using a reducing agent. The catalytic layer of the fuel cell electrode contains the resulting conductive polymer containing the catalytic component. In this case, an anionic substance can be used as the catalytic component. An inorganic acid ion can be used as the anionic substance.

Inorganic acid ion refers to an ion complex which is the source for the metal element used as a catalyst. Its structure is not limited. One example includes chloroplatinic acid. The precursor monomer is the same as that used in the first embodiment.

Any standard reducing agent can be used. One example is an oxalic acid aqueous solution.

The second embodiment of the fuel cell electrode is manufactured by the following method.

First for the catalytic layer, an aqueous solution containing the precursor monomers and anionic inorganic acid ion (catalytic component) is prepared. Water-repellant carbon is prepared for the diffusion layer. Then, referring to FIG. 3, one side of the water-repellant carbon is brought into contact with this aqueous solution water surface, and a current is applied between it and a counter electrode (made of graphite, for example) provided separately in the solution (electrolytic polymerization). The metal contained in the inorganic ion is then reduced and becomes an elemental substance. Next, the water-repellant carbon on which the conductive polymer containing the catalytic component is formed is washed.

The following is an alternate manufacturing method.

First, for the catalytic layer, an aqueous solution containing the precursor monomers and anionic inorganic acid ion (catalytic component) is prepared. Water-repellant carbon is prepared for the diffusion layer. An oxidation agent is then dripped into this aqueous solution while stirring (chemical polymerization). The metal contained in the inorganic acid ion contained in the polymerized product is then reduced into the elemental substance. Next, this is dried and pulverized, and a conductive polymer containing the catalytic component is obtained. Lastly, the product of the previous step is applied onto the water-repellant carbon.

Figure 2B:
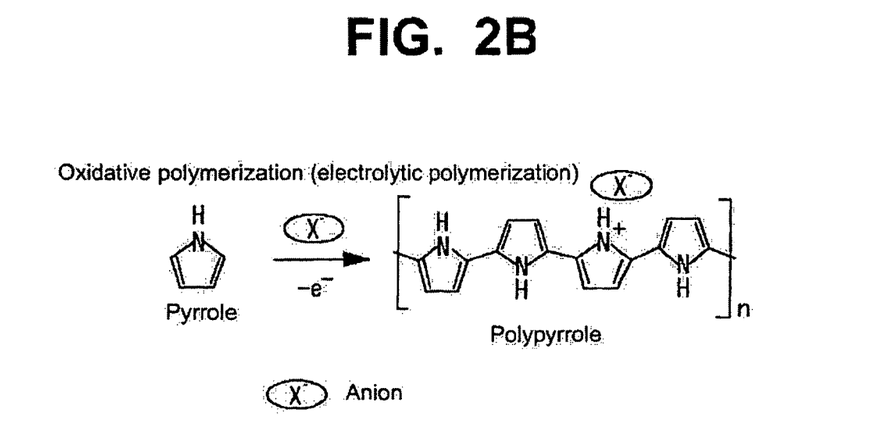
FIG. 2(b) shows the oxidative polymerization of pyrrole.

Next, the action of the fuel cell electrode of a second embodiment is described. In the oxidative polymerization process, the precursor monomer for the conductive polymer and the catalytic component are oxidatively polymerized (electrolytic polymerization or chemical polymerization). Oxidative polymerization is conducted as the precursor monomers incorporate the anionic inorganic acid ion (platinum chloride acid ion complexes $H[Pt(Cl)_6]^-$, $[Pt(Cl)_6]^{2-}$, for example) as a dopant, and this becomes the conductive polymer containing the catalyst component. The incorporated inorganic acid ion interacts electrostatically with the cationic portion on the molecular chain of the conductive polymer (See FIGS. 2(a) and 2(b)). In other words, when the anionic catalytic component is introduced as a dopant, the catalytic component enters the polymer with an electrostatic interaction with the cationic portion of the conductive polymer chain. As a result, the catalytic component enters the conductive polymer highly dispersed at a high density without the catalytic components aggregating with each other. This is the same as with the fuel cell electrode of the first embodiment.

Pt as an elemental substance functions as a catalyst, not as an inorganic acid ion. As a result, Pt is reduced in a reducing process. However, because Pt in the form of the inorganic acid ion is incorporated at a high dispersion and high density, even if Pt becomes covalently bonded to the conductive polymer after reduction, this will not affect the dispersion of Pt. Therefore, Pt is uniformly dispersed at a high density in the conductive polymer.

The following relates to a fuel cell relating to the embodiments. Each fuel cell electrode is joined to both sides of a fluorocarbon-type ion exchange resin as an electrolytic membrane, with the conductive polymer containing catalytic component (catalytic layer) on the inner side (see FIG. 1). Due to the action of the first and second modes, the three phase interface is efficiently formed continuously throughout the entire catalyst. Additionally, because the catalyst is adequately dispersed, the catalyst utilization rate at the three-phase interface is improved. Therefore, a high discharge property is seen.

EXAMPLES

Example 1

The conductive Polymer Contains Inorganic Acid Ion by Electrolytic Polymerization A solution A of 0.01 M concentration of chloroplatinic acid and 0.1 M aniline was prepared.

A carbon paper (thickness 0.1 mm) impregnated with a dilute Teflon® dispersion solution and dried was sintered under a nitrogen atmosphere at 300° C. As shown in FIG. 3, one side of the resulting electrode diffusion layer was placed in contact with the water surface of solution A. Between this and a graphite counter electrode provided separately in solvent A, a constant current of 5 mA for every 1 $cm^2$ of electrode diffusion layer surface area was applied for 10 minutes. Current was applied with the electrode diffusion layer side as the positive (+) electrode. Aniline was oxidatively polymerized in an electrochemical manner due to this current (electrolytic polymerization). A uniform layer of polyaniline was formed on the surface of the electrode diffusion layer. When the polyaniline was analyzed, for every 1 $cm^2$ of apparent surface area of the electrode diffusion layer, there was approximately 0.5 mg of Pt.

The carbon paper with the Pt-containing polyaniline layer was immersed in a oxalic acid solution, and after the Pt in the polyaniline was reduced, this was sufficiently washed and dried with pure water, and an electrode A was completed.

Two electrodes A with the polyaniline catalytic layer on the inside were placed on either side of Nafion® with a membrane thickness of approximately 50 micrometers, and a small fuel cell A was completed.

Example 2

The Conductive Polymer Contains Inorganic Acid Ion by Chemical Polymerization Pyrrole (for a concentration 0.1 M) and chloroplatinic acid (concentration 0.01 M) were dissolved in an acetonitrile solution. While stirring, the solution was maintained at 0° C., and 0.2 M concentration of ammonium peroxodisulfate was dripped. While maintaining a temperature of 0° C., this was stirred for one day and oxidative polymerization (chemical polymerization) was conducted. After filtering and washing the resulting polymerized product, this was reduced in an oxalic acid solution. After washing with pure water again and drying, this was pulverized, and a polypyrrole powder containing Pt was obtained. This powder was laid on top of the same electrode diffusion layer as used in Example 1 so that the amount of Pt was approximately 0.5 mg per 1 $cm^2$ of area of diffusion layer. This was pressed together with a room temperature roller, and electrode B was completed. Using this electrode B, a test fuel cell B was created by the same method as in Example 1.

Comparative Examples 3-5

An electrode catalyst in which Pt is supported on carbon black (Cabot company Vulcan XC-72) at a density of 40% by weight was mixed with a 5% by weight Nafion® solution (mixture solvent of water and ethanol) to make a paste. This paste was coated onto the surface of the same electrode diffusion layer as Example 1. This was vacuum dried at 100° C., and a catalytic layer was formed. Electrodes (carbon supported Pt of the prior art) were obtained. Electrodes C, D, and E were created by having weight ratios of 0.5, 1.0, and 1.5, respectively, for the ratio of the weight of Nafion® with respect to the weight of carbon in the catalytic layer. The amount of Pt for all of these electrodes was 0.5 mg per 1 $cm^2$ of electrode surface. Using these electrodes, test fuel cells C, D, and E were created by the same method as in Example 1.

Evaluation Tests Relating to Examples 1 and 2 and Comparative Examples: 3-5

Using test fuel cells A-E, discharge tests of the fuel cells were conducted. With fuel cell temperatures of 80° C., they were tested under two conditions, (1) humidification of hydrogen and air to a dew point of 80° C. (high humidification (see FIG. 4)) and (2) humidification of hydrogen and air to a dew point of 50° C. (low humidification (see FIG. 5)). From the results shown in FIGS. 4 and 5, with test fuel cells A and B (Examples 1 and 2), the discharge property was not affected by the change in humidification, and the fuel cells were stable and had a relatively high and good discharge property. With test fuel cells C, D, E (Comparative Examples 3-5) they were determined to be unstable as their discharge properties changed with the humidification conditions.

Without being bound by any theory, it is believed that test fuel cells A and B of the present invention maintained a relatively high and good discharge property regardless of the humidification conditions. Because Polyaniline and polypyrrole which are electroconducting members also have ionic conductivity in addition to electroconductivity and gas diffusivity. As a result, an electrolyte component is unnecessary in the electrode catalytic layer. The tradeoff problem of the prior art in which raising electroconductivity lowered ionic conductivity (or raising ionic conductivity lowered electroconductivity) is thought to be solved.

Figure 4:
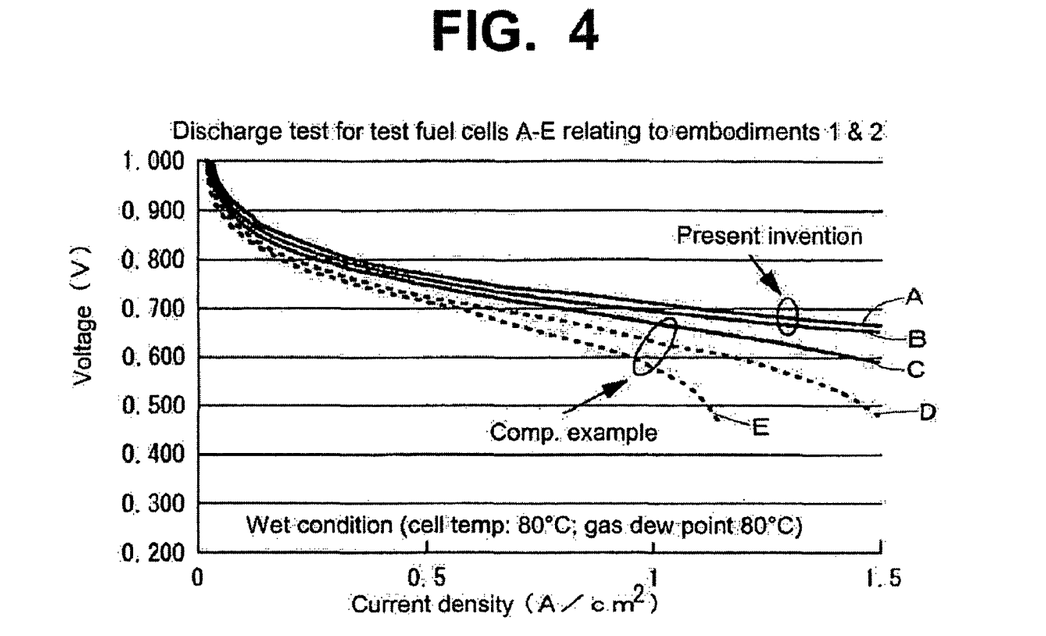
FIG. 4 is a graph showing the results from a discharge experiment under humidification of fuel cells A-E relating to two embodiments of the present invention
Figure 5:
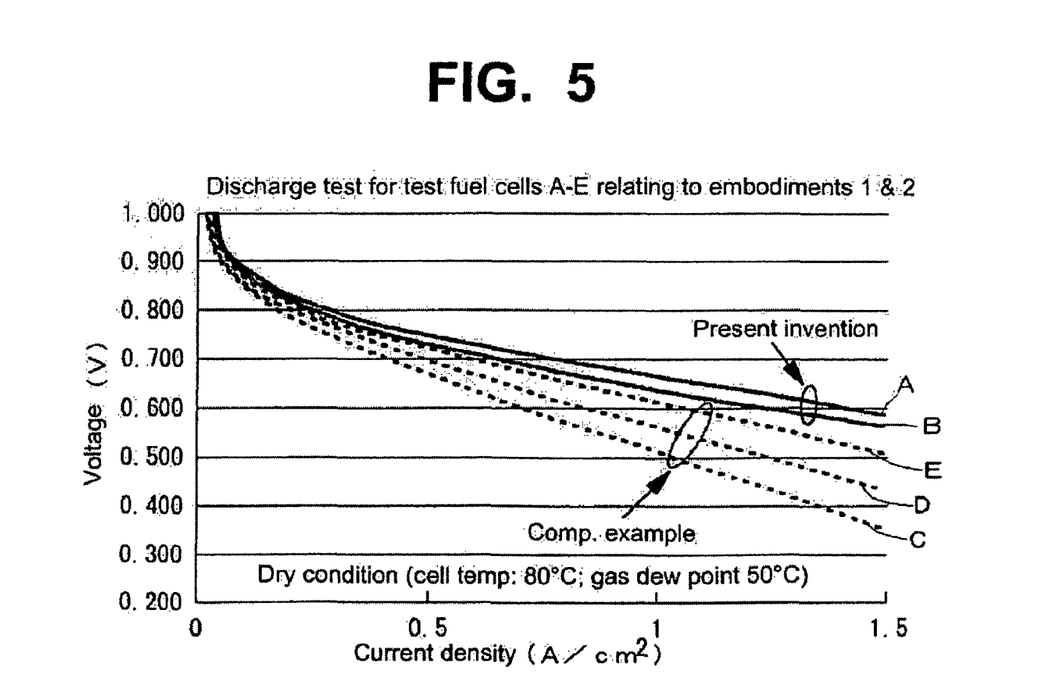
FIG. 5 is a graph showing the results from a discharge experiment under low humidification of fuel cells A-E relating to two embodiments of the present invention.

Without being bound by any theory, it is believed that the discharge properties were different depending on the humidification conditions when test fuel cells C-E of the comparative example were used because referring to FIG. 4, under high humidification conditions, the higher the Nafion® weight with respect to the carbon weight, the greater the dropoff of voltage in the high current density region. This is thought to be because the volume of pores in the carbon in the catalytic layer is reduced, and the plugging of pores due to water formation is more likely. In contrast, under low humidification conditions of FIG. 5, the smaller the weight of Nafion® with respect to the weight of carbon, the greater the slope of the I-V curve over the entire current range. This is thought to be because under dry (low humidification) conditions, when the amount of electrolyte is low, ionic conductivity is reduced. In other words, there is increased internal resistance.

Example 6

Figure 6:
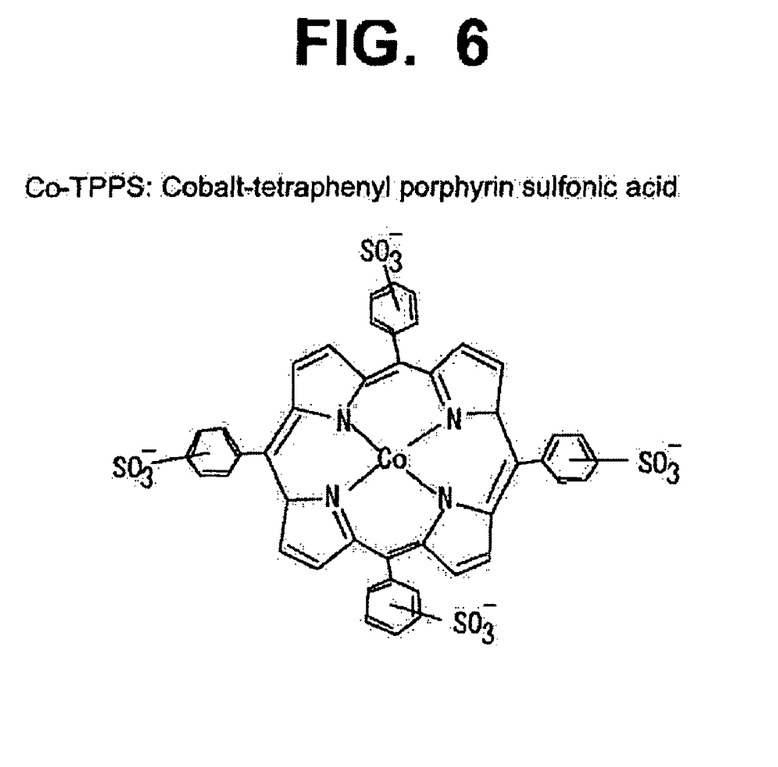
FIG. 6 shows the chemical structure of cobalt tetraphenyl porphyrin sulfonic acid (Co-TPPS) when there is electrolytic dissociation in an aqueous solution.

Conductive Polymer Contains an Ionic Macrocycle Complex by Electrolytic Polymerization An aqueous solution F containing 1 mM dissociated anionic cobalt-tetraphenyl porphyrin sulfonate (Co-TPPS, see FIG. 6) and 0.1 mM aniline was prepared.

A carbon paper (thickness 0.1 mm) impregnanted with a dilute Teflon® dispersion solution and dried was sintered under a nitrogen atmosphere at 300° C. As shown in FIG. 3, one side of the resulting electrode diffusion layer was placed in contact with the water surface of solution F. Between this and a graphite counter electrode provided separately in solvent F, a constant current of 5 mA for every 1 $cm^2$ of apparent surface area of the electrode diffusion layer was applied for 10 minutes (electrolytic polymerization). At this time, current was applied with the electrode diffusion layer side as the positive (+) electrode. Aniline was oxidatively polymerized in an electrochemical manner due to this current. A uniform layer of polyaniline was formed on the surface of the electrode diffusion layer. After adequately washing with pure water and drying, an electrode F was completed. When the polyaniline was analyzed, for every 1 $cm^2$ of apparent surface area of the electrode diffusion layer, there was approximately 0.3 mg of cobalt.

Two electrodes F with the polyaniline catalytic layer on the inside were placed on either side of Nafion® which has a membrane thickness of approximately 50 micrometers, and a small fuel cell F was completed.

Comparative Example 7

Figure 7:
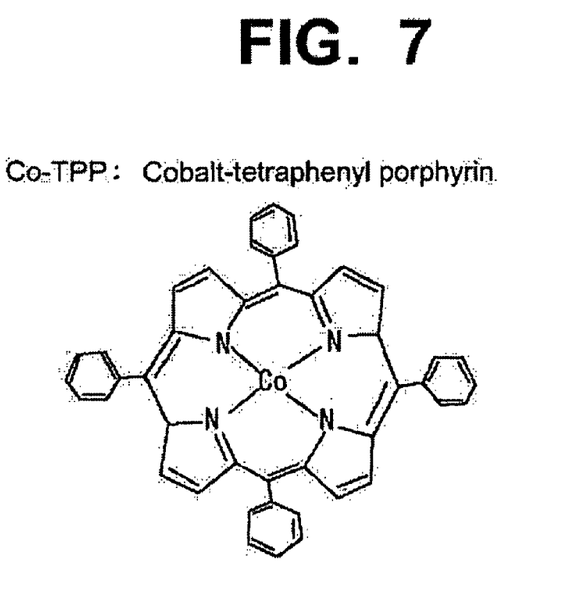
FIG. 7 shows the chemical structure of cobalt-tetraphenyl porphyrin (Co-TPP).

Carbon black (Cabot company Vulcan XC-72) was dispersed in a toluene solution of cobalt-tetraphenyl porphyrin (Co-TPP, see FIG. 7), which does not dissolve in water and is not anionic. After stirring well, toluene was evaporated by a rotary evaporator, and a catalyst of Co-TPP supported on carbon black was obtained. The supported density of cobalt ions was approximately 1% by weight. This catalyst was mixed with a 5% by weight Nafion® solution (mixture solvent of water and ethanol) to make a paste. This paste was coated onto the surface of the same electrode diffusion layer as Example 6. This was vacuum dried at 100° C., and a catalytic layer was formed, and an electrode G was completed. The weight ratio of Nafion® with respect to the weight of carbon in the catalytic layer was 1.0. The amount of cobalt was adjusted to approximately 0.3 mg per 1 cm$^2$ of electrode surface. Two electrodes G were used to create a test fuel cell G by the same method as Example 6.

Evaluation Test Relating to Example 6 and Comparative Example 7

Figure 8:
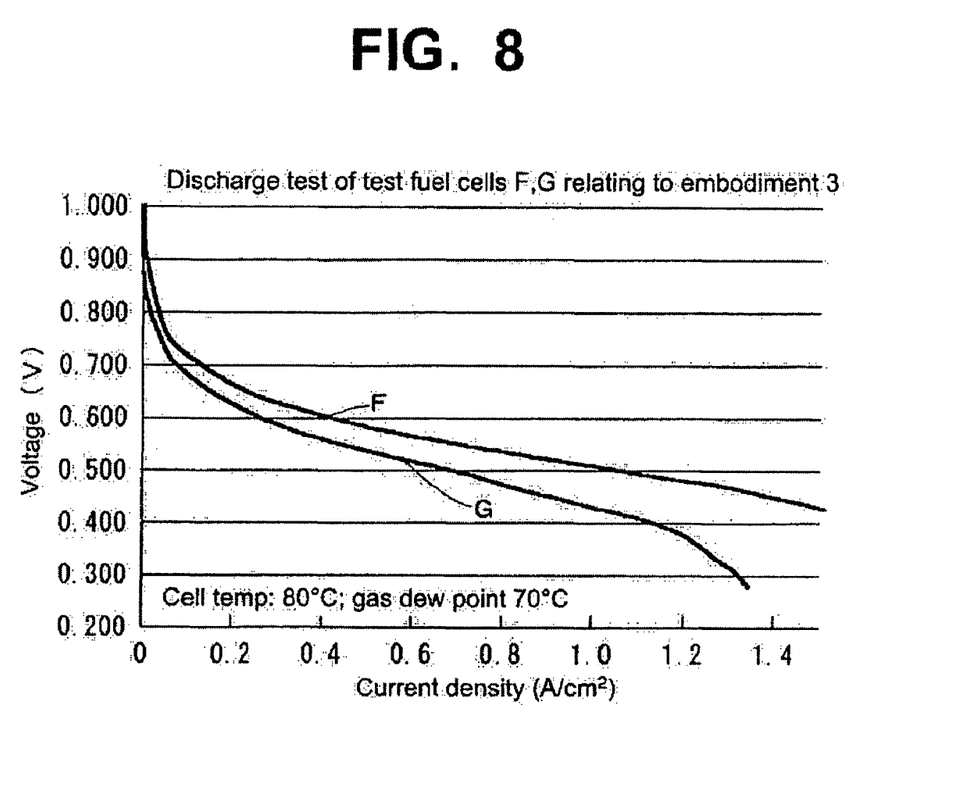
FIG. 8 is a graph showing the results of a discharge experiment of fuel cells F, G relating to an embodiment of the present invention.

Using test fuel cells F and G, a discharge test of the fuel cells were conducted. Under the test conditions, the fuel cell temperature was 80° C., and the hydrogen and air were humidified and supplied with a dew point of 70° C. The results are shown in FIG. 8.

Test fuel cell F (Example 6) in which an anionic catalytic component is dispersed in a polyaniline showed a higher voltage compared with test fuel cell G (Comparative Example 7) in which a non-anionic catalytic component is supported on carbon black. The reason for this is thought to be because, even though the amount of catalyst supported in both test fuel cells F and G are the same, with test fuel cell F which has had electrolytic polymerization, the catalytic component is incorporated by the electrostatic interaction with the + ions in the conductive polymer matrix. As a result, the catalytic component is dispersed adequately at a high density. On the other hand, with test fuel cell G, there is not adequate interaction between the non-anionic catalytic component and carbon black. As a result, the catalytic component is not dispersed and becomes aggregated, and as a result, the voltage is lower.

Particularly with the method of Example 6, the catalytic component is dispersed in the polyaniline in an anionic form. As a result, there is accelerated movement of charge with the conductive polymer matrix, and the catalytic action is improved.

The modes for implementing the present invention and embodiments are described above. The present invention is not limited to these. For example, we described the use of the present invention in polymer electrolyte membrane fuel cells, but the present invention is not limited to this and can be used for electrodes of electrochemical devices such as alkaline fuel cells, water electrolysis apparatus, halogenated hydroacid electrolysis apparatus, salt electrolysis apparatus, oxygen and/or hydrogen concentrating apparatus, humidity sensor, gas sensor, and the like.

All patents, patent applications, international test methods mentioned herein are hereby incorporated by reference in their entireties.

What is claimed is:

1. A fuel cell electrode, comprising:
a catalytic layer comprising a conductive polymer containing a catalytic component, wherein the catalytic component is dispersed throughout the conductive polymer;
wherein said conductive polymer is obtained through an oxidative polymerization process in which precursor monomers for said conductive polymer are oxidatively polymerized with said catalytic component;
wherein said catalytic component comprises an anionic substance that may be an ionic macrocylce complex; and
wherein said precursor monomers are one or more monomers selected from the group consisting of aniline, pyrrole, thiophene, acetylene, and monomers with side chains attached to backbones thereof.

2. A fuel cell electrode, comprising:
a catalytic layer comprising a conductive polymer containing a catalytic component,
wherein said conductive polymer is obtained by an oxidative polymerization process and a reduction process,
wherein in said oxidative polymerization process, precursor monomers of said conductive polymer are oxidatively polymerized with said catalytic component, and in said reduction process, said catalytic component is reduced with a reducing agent,
wherein said catalytic component comprises an anionic substance that may be an ionic macrocylce complex,
wherein said precursor monomers are one or more monomers selected from the group consisting of aniline, pyrrole, thiophene, acetylene, and monomers with side chains attached to backbones thereof; and
wherein said catalytic component is dispersed throughout the conductive polymer.

3. A fuel cell electrode according to claim 2, wherein said anionic substance comprises an inorganic acid ion.

4. A fuel cell electrode according to claim 1, wherein said precursor monomers comprise monomers which, when polymerized, form a pi-conjugated polymer.

5. A fuel cell electrode according to claim 4, wherein said pi-conjugated polymer is one or more selected from the group consisting of polyaniline, polypyrrole, polythiophene, polyacetylene, and conductive polymers with side chains attached to molecular backbones thereof.

6. A fuel cell comprising a fuel cell electrode according to claim 1.

7. A fuel cell comprising a fuel cell electrode according to claim 2.

* * * * *